July 13, 1937.  N. O. MARQUART  2,087,093

QUICK RESET ODOMETER

Filed Feb. 29, 1936

Inventor

Norman O. Marquart

By Blackmore, Spencer & Flint

Attorneys

Patented July 13, 1937

2,087,093

UNITED STATES PATENT OFFICE 2,087,093

QUICK RESET ODOMETER

Norman O. Marquart, Rochester, N. Y., assignor to General Motors Corporation, Detroit, Mich., a corporation of Delaware Application February 29, 1936, Serial No. 66,361

3 Claims. (Cl. 235—144)

This invention relates to counting apparatus and has been developed more particularly as an improved resetting device for odometers.

An object is to provide a resetting mechanism useful when it is desired to quickly restore the several wheels of a set to zero reading position.

As a further object it is desired to provide mechanism to accomplish the major object without the exertion of axial thrust when any one wheel picks up the next to rotate with it.

Additionally the invention is designed to accomplish its major objective at minimum cost and yet with a high degree of efficiency.

Other objects and advantages, including simplicity and ease of assembly, will be understood from the accompanying description.

The invention is illustrated by an accompanying drawing in which.

Figure 1:
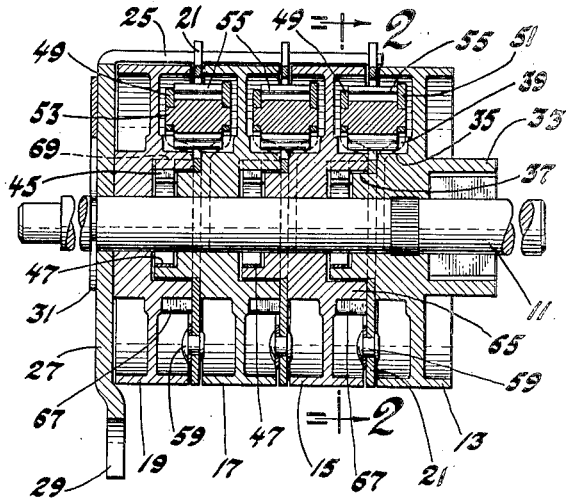
Fig. 1 is a longitudinal sectional view.

Referring to the drawing, there is seen a shaft 11 to which is secured a wheel 13 marked with characters to designate decimal parts of a unit. Wheels 15, 17, and 19 are mounted freely on shaft 11. Between each pair of adjacent wheels is a pinion carrier 21. These carriers 21 have oppositely positioned notches 23 to receive locking arms 25 projecting from an end plate 27 formed with a radial extension 29. The arms 25 hold the carriers from relative rotation and the several carrier plates are held in fixed position when the extension 29 is secured on its support (not shown). The end plate surrounds the shaft 11 and endwise movement of the wheels toward the left (Fig. 1) is prevented by a removable retainer 31. Any suitable means may be provided for engaging hub 33 of the decimal wheel 13 and rotating the same in the act of normal operation and for resetting.

Figure 2:
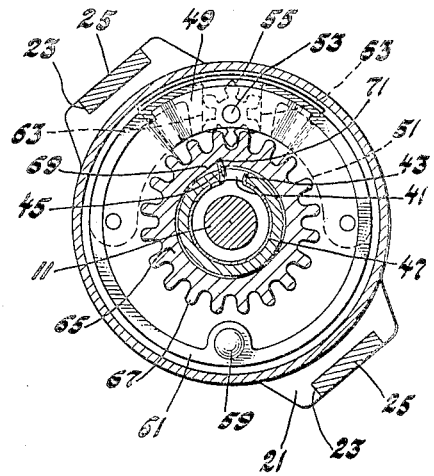
Fig. 2 is a transverse section on line 2—2 of Fig. 1.
Figure 3:
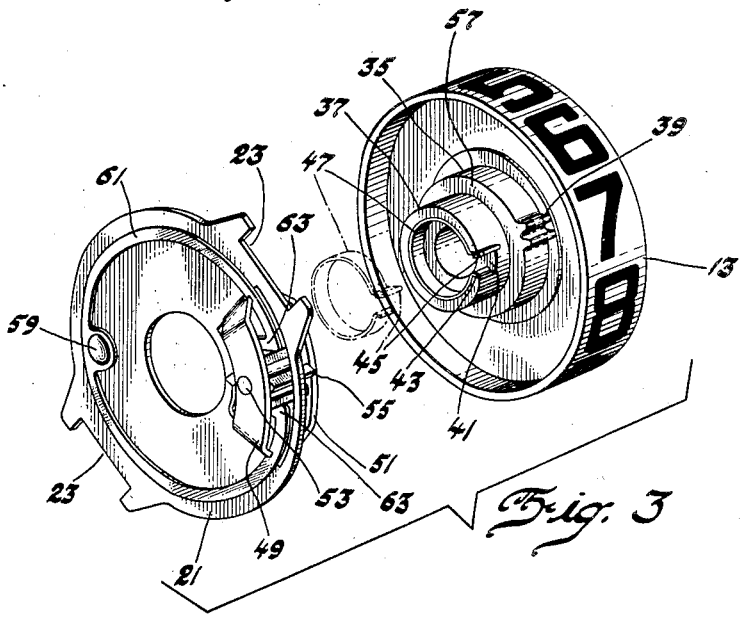
Fig. 3 is a view of parts in perspective and in disassembled relation.

On the side of wheel 13 opposite hub 33 are two spaced hubs 35 and 37 of unequal radii. Projecting from hub 35 are two teeth 39. Hub 37 is hollow and within the annular wall is an axial slot 41 into which project the ends 43 and 45 of a spring ring 47 located within the hub. The carrier 21 is provided with spaced parts 49 and 51 carrying the spindle 53 of the pinion 55. When the carrier 21 is assembled about hub 37 adjacent the shoulder 57 between hubs 35 and 37, the teeth of the pinion are positioned in the path of teeth 39 as the wheel 13 rotates. To the face of carrier 21 is riveted at 59 a ring-shaped spring 61 having ends 63 adapted to resiliently engage and prevent any undesired rotation of pinion 55, but designed to yield to permit the rotation of the pinion by teeth 39 when wheel 13 is in the act of turning wheel 15. In order to be so rotated by the pinion 55, the wheel 15 has a hollow hub 65 assembled around hub 37 and a complete series of teeth 67 engaging the pinion 55. This hollow hub has a notch 69 to engage the extended end 45 of the spring ring 47. One end of the notch is tapered and its other end is flat radially. It will be seen that if wheel 13 rotates in the direction for normal progressive counting (counterclockwise as seen in Fig. 2) the spring end 45 is depressed along the tapered wall of the notch 69 and into the hub 65 of wheel 15 and wheel 15 is not rotated until teeth 39 engage the teeth of pinion 55. If, however, the wheel 13 is oppositely rotated as it is in the act of quick resetting, the spring end 45 at some time during a single rotation of wheel 13 engages the radial surface 71 at the end of the notch 69 and the two wheels 13 and 15 thereafter rotate together. In so rotating together the ends 63 of spring 61 spread apart to permit rotation of the pinion as is obviously necessary to accommodate the joint rotation of the wheels.

Similar mechanism is provided between wheels 15 and 17 and between wheels 17 and 19. It will be seen that during no more than one rotation of wheel 13 in a direction the reverse of that for advance counting, it picks up wheel 15 and the two rotate together. Similarly at some time during one rotation of wheel 15 this wheel picks up and rotates wheel 17 and wheel 17 does likewise to wheel 19. The position of the slot 41 is such relative to the figures on the wheels that axial alignment of like figures occurs when each wheel picks up the next. In this way a quick reset to alignment of like figures is effected by a few turns of the decimal wheel 13.

The thrust of spring end 45 is transverse and without an axial component whereby tendency to spread apart the figure wheels is avoided. The parts are easily assembled, are cheap to manufacture, and the operation is very satisfactory.

I claim:

1. In counting apparatus, a plurality of wheels arranged in series, a transfer pinion rotatable on a fixed axis located between said wheels, the wheels having telescoping hubs and teeth to engage said transfer pinion, one of said hubs having a notch and the other having a spring with a radial projection received within said notch whereby quick resetting may be had.

2. In counting apparatus, a plurality of figure wheels, a transfer pinion with a fixed axis positioned between said wheels, a plurality of hubs on a first one of said wheels, a first of one of said hubs having a pair of radially directed teeth to engage said transfer pinion, the second hub being hollow and having an axial slot, a ring within said hollow hub having deflected ends engaging the walls of said slot, one of said ends being relatively longer and projecting radially beyond the slot, the second figure wheel having a gear ring to engage said pinion and a hub rotatable about the second hub of the first figure wheel, said second figure wheel having a notch to engage said radially projecting end of the ring.

3. In counting apparatus, axially disposed figure wheels, transfer mechanism therebetween including a fixedly mounted pinion, yielding means to normally hold said pinion from rotation, a first one of said figure wheels carrying a driving member in the form of an annular ring with a radial projection, the second of said figure wheels having a notch with a sloping wall and radial wall to receive said projection whereby the first wheel may progressively rotate the second wheel through said pinion in one direction of rotation and whereby the first wheel may rotate the second wheel continuously with itself upon the engagement of said projection with said radial wall, the yielding means functioning to permit such joint rotation.

NORMAN O. MARQUART.